(12) United States Patent
Stadlmann

(10) Patent No.: US 12,377,602 B2
(45) Date of Patent: Aug. 5, 2025

(54) POST-EXPOSURE UNIT

(71) Applicant: DENTSPLY SIRONA Inc., York, PA (US)

(72) Inventor: Klaus Stadlmann, Vienna (AT)

(73) Assignee: Dentsply Sirona Inc., York, PA (US)

( * ) Notice: Subject to any disclaimer, the term of this patent is extended or adjusted under 35 U.S.C. 154(b) by 254 days.

(21) Appl. No.: 17/775,673

(22) PCT Filed: Nov. 16, 2020

(86) PCT No.: PCT/EP2020/082284
§ 371 (c)(1),
(2) Date: May 10, 2022

(87) PCT Pub. No.: WO2021/094617
PCT Pub. Date: May 20, 2021

(65) Prior Publication Data
US 2022/0388234 A1 Dec. 8, 2022

(30) Foreign Application Priority Data

Nov. 15, 2019 (AT) ................................ A 50997/2019

(51) Int. Cl.
*B29C 64/245* (2017.01)
*B29C 64/129* (2017.01)
(Continued)

(52) U.S. Cl.
CPC .......... *B29C 64/129* (2017.08); *B29C 64/245* (2017.08); *B29C 64/277* (2017.08);
(Continued)

(58) Field of Classification Search
CPC .................................................... A61C 19/003
See application file for complete search history.

(56) References Cited

U.S. PATENT DOCUMENTS 11,155,032 B2 * 10/2021 Kwak ................ B29C 35/0805
2009/0283119 A1 * 11/2009 Moussa ................ B29C 71/04
134/147
(Continued)

FOREIGN PATENT DOCUMENTS

| AU | 2020382929 A1 | 4/2022 |
| CA | 3156454 A1 | 5/2021 |

(Continued)

OTHER PUBLICATIONS

International Search Report; PCT/EP2020/082284; Feb. 11, 2021 (completed); Feb. 19, 2021 (mailed).
(Continued)

*Primary Examiner* — Timothy Kennedy
(74) *Attorney, Agent, or Firm* — SCHWEGMAN LUNDBERG & WOESNNER, P.A.

(57) ABSTRACT

A post-exposure unit for post-exposure of a body manufactured using an additive manufacturing method from a substance curable by radiation, the post-exposure unit comprising at least one radiation source configured for post-exposure, the post-exposure unit including at least one radiation sensor, the radiation sensor being adapted to capture radiation emitted by the radiation source. The post-exposure unit has a receiving space for receiving a body to be post-exposed. The radiation sensor is adapted to capture radiation emitted by the radiation source and traverses at least a part of the receiving space at least once.

15 Claims, 12 Drawing Sheets

(51) Int. Cl.
  *B29C 64/277* (2017.01)
  *B33Y 10/00* (2015.01)
  *B33Y 30/00* (2015.01)
  *B33Y 50/02* (2015.01)
(52) U.S. Cl.
  CPC ............... *B33Y 10/00* (2014.12); *B33Y 30/00* (2014.12); *B33Y 50/02* (2014.12)

(56) References Cited

U.S. PATENT DOCUMENTS

| | | |
|---|---|---|
| 2012/0032575 A1 | 2/2012 | Noguchi |
| 2017/0140522 A1 | 5/2017 | Nam et al. |
| 2017/0246797 A1 | 8/2017 | Lambrecht |
| 2019/0240924 A1 | 8/2019 | Hendrik |

FOREIGN PATENT DOCUMENTS

| | | |
|---|---|---|
| DE | 102016102811 A1 | 8/2017 |
| EP | 4058277 A1 | 9/2022 |
| JP | 2006305362 A | 11/2006 |
| JP | 2012034891 A | 2/2012 |
| JP | 2014008765 A | 1/2014 |
| JP | 2023501652 A | 1/2023 |
| RU | 2145924 C1 | 2/2000 |
| WO | 2021071481 A1 | 4/2021 |
| WO | WO-2021094617 A1 | 5/2021 |

OTHER PUBLICATIONS

Written Opinion of the International Searching Authority; PCT/EP2020/082284; Feb. 11, 2021 (completed); Feb. 19, 2021 (mailed).
International Preliminary Report on Patentability; PCT/EP2020/082284; Feb. 11, 2021 (completed); Feb. 19, 2021 (mailed).
Russian Office Action dated Mar. 21, 2024.
"European Application Serial No. 20807737.0, Response to Communication pursuant to Rules 161(1) and 162 EPC filed Dec. 30, 2022", 39 pgs.
"Japanese Application Serial No. 2022-528086, Notification of Reasons for Refusal mailed Oct. 23, 2024", W/ English translation, 8 pgs.

* cited by examiner

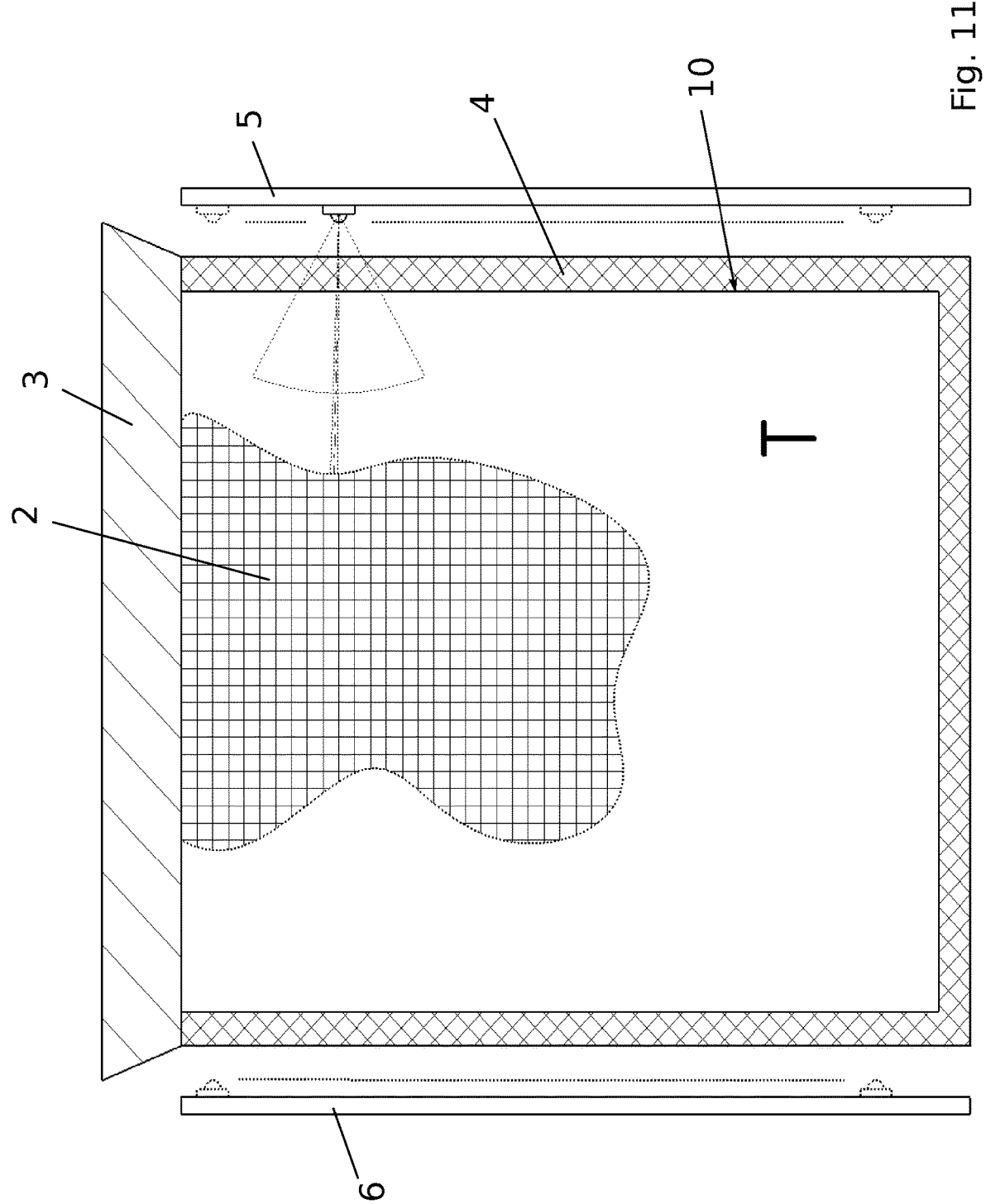

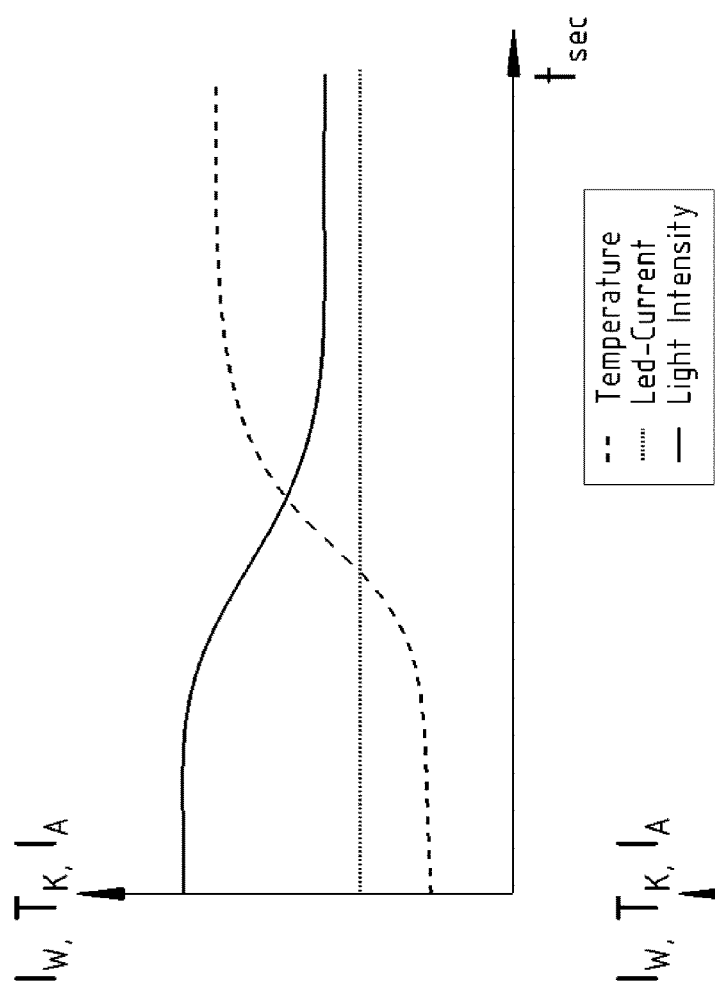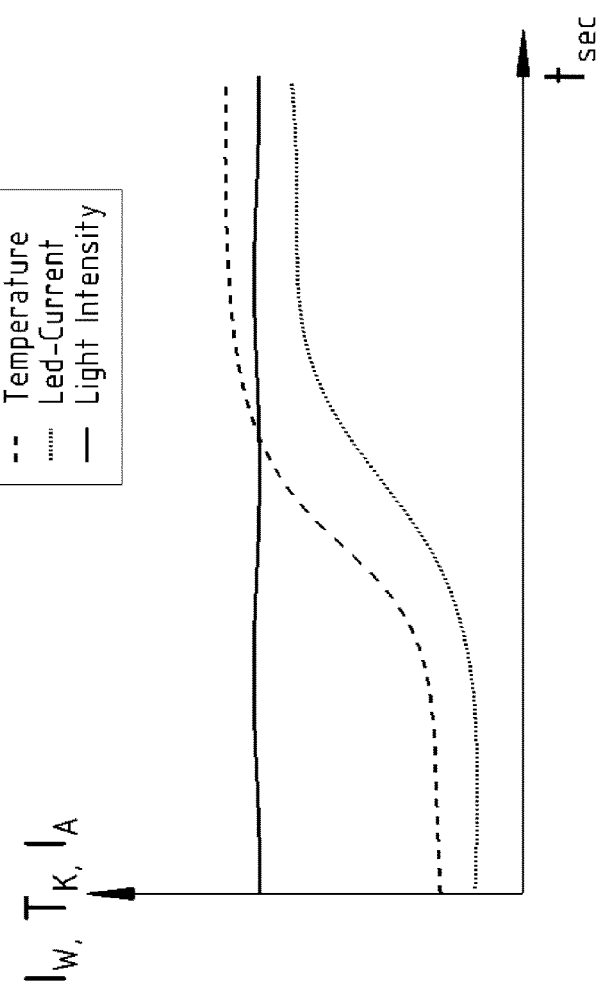

POST-EXPOSURE UNIT

CROSS-REFERENCE TO RELATED APPLICATIONS

This is a National Phase application of International Application No. PCT/EP2020/082284, filed Nov. 16, 2020, which claims the benefit of and priority to Austrian Application Ser. No. A50997/2019, filed on Nov. 15, 2019, which are herein incorporated by reference for all purposes.

TECHNICAL FIELD

The invention relates a device for post-curing a body generated by a 3D printing process from a substance, curable by radiation, the post-curing unit being equipped with at least one radiation source that is capable of further final curing of a component and wherein at least one radiation sensor (e.g. a light sensor) is comprised in the post-exposure unit, which is able to capture the radiation and may be connected to a control unit/processing unit which is able to control or regulate the at least one radiation source and read the radiation sensors.

The invention also relates to a method for intelligent and sensor-assisted post-exposure of a body built up in layers made of a substance curable by radiation that is received in a vat, the body being at least partially cured or dimensionally stable, the process variables relevant for post-curing being captured via at least one suitable radiation sensor (e.g. photodiodes, photoresistor) and optionally process-relevant states of the exposure chamber (chamber) and/or the body being able to be captured via at least one sensor, e.g. to ensure a stable and traceable post-exposure process, which may constitute part of the post-processing chain.

BACKGROUND

Devices and method for building up a three-dimensional body in layers from a substance curable by radiation are also known under the terms 3D printing, additive manufacturing or rapid prototyping. The cross-sectional information of the substance to be cured in layers by electromagnetic radiation, for example, a photo resin, is thereby generally created by a mask projection method or by a laser source (e.g. by a stereolithography process). In generative production machines that enable a continuous printing process, pixel-controlled DLP (digital light processing), MEMS (microelectromechanical systems), LC (liquid crystal) displays, LED displays or controllable lasers are mostly used for the exposure of the cross-section or the layers. The exposure thereby generates a solid layer from the liquid, photosensitive substance. This layer adheres to a carrier and is detached or removed from a reference surface by lifting the carrier. In subsequent production steps, the cured layer, detached from the reference surface, functions as a carrier. A three-dimensional body is thus successively drawn or formed from the photosensitive substance.

A known problem here is that in post-processing and especially during post-exposure, it cannot be ensured whether the process variables correspond to the specifications and whether the state of the process chamber or the post-exposure unit corresponds to a target state.

The application US 2019/0240924 A relates to a device for post-processing of a 3D printed component made of photo-reactive material. A post-exposure unit is also described here which has a vertical motor-driven axis and in which the component to be cured is irradiated by the radiation source via deflection mirrors. The component can be irradiated by a plurality of lamps which can also have different wavelengths.

DE 102016102811 A1 relates to a post-exposure device comprising a receiving device for receiving a product produced by stereolithography, a radiation device for irradiating a product received in said receiving device, and a radiation sensor to detect the radiation intensity and the radiation wavelength of the radiation source. The radiation sensor is arranged to perform a self-test to verify the desired performance and function. DE 102016102311 A1 does not disclose an arrangement of the radiation sensor relative to the receiving device.

Although the known devices for the final curing of a 3D printed blank are known, there is a need for improved, optionally automated devices, particularly for a device that enables a more extensive capturing of states and the precise control of process parameters.

SUMMARY

It is an object of the invention to create a device and a method as specified at the outset which, in the simplest and most reliable way possible, enable capturing and control of process variables and capturing of the state of the post-exposure unit (chamber) and thus a reliable and above all stable post-curing of the body with the least possible waste. In addition, error states in the post-exposure step should be reliably detected or avoided.

For this purpose, the invention provides a device as defined in claim 1 and a method as defined in claim 10. Advantageous embodiments and developments are specified in the dependent claims.

According to the present disclosure, it is provided that the post-exposure unit has a receiving space in which the body to be post-cured can be introduced, for example, by hanging it on a build platform, the body being irradiated with radiation from at least one side and the radiation sensor is configured to capture radiation emitted by the radiation source and traversed at least a part of the receiving space at least once. I.e. the radiation sensor is arranged to capture radiation that has traversed at least a part of the receiving space. For example, at least one radiation sensor may be located in or outside the receiving space that is able to capture the radiation emitted by a light source or the emitted spectrum.

The post-exposure unit here may constitute at least part of equipment for the post-treatment of 3D printed bodies and may constitute a sub-step of the so-called post-processing, the entire process being able to be made more stable by means of the sensor system and the entire 3D printing process consisting of the "printing" and the entire post-processing being able to be better automated by means of the determined data.

For this purpose, the post-exposure unit can be equipped with different radiation sources, such as LEDs that emit visible light or UV radiation of a certain wavelength or, when combining, for example, a plurality of LEDs, a predetermined spectrum.

The body to be post-cured here can be introduced into the receiving space or chamber from above by means of an automatic gripper with the help of the build platform and the body can be finally cured, for example, by electromagnetic radiation, particularly by light such as visible light or UV (ultraviolet) light. Particularly, the chamber can be brought to a certain temperature by a heating device, for example, 50 to 120° C. and, optionally, can also be loaded with a process gas/protective gas such as nitrogen.

The build platform, which may be appropriately designed as a flat plate, may serve as a platform on which the body is attached; it can optionally serve as an additional reflector and end cover for the exposure chamber.

Using a sensor system built into a chamber, among other things, conclusions can be drawn about the power density of the radiation source, the state of the radiation source or its aging, as well as the degree of contamination or the state of the chamber and the presence of a body on the build platform. In addition, when a plurality of radiation sources is used in combination with a plurality of sensors, the post-exposure unit can control the radiation intensity as a function of the position and the type of body.

With the help of the radiation sensors, which can, for example, be arranged opposite the radiation source, conclusions can also be drawn about the radiation distribution within the post-exposure unit.

The chamber can be connected to a control device/processing unit which is able to drive the radiation sources and to read a sensor system comprising the at least one radiation sensor and to transfer all signals for further processing.

The inside of the chamber may be designed at least partially reflective.

The sensor system can, for example, compensate for aging of the radiation source, compensate for temperature-dependent behavior, adapt the radiation intensity and, optionally, the wavelengths or the spectrum, detect the failure of radiation sources, determine contamination of the chamber, ascertain the presence of a body, calibrate the chamber and determine and set the exposure time and dose.

The sensor may be appropriately accommodated in the chamber or, when LEDs are used as a radiation source, may be provided together with them on a corresponding circuit board.

When the description refers to the terms height, horizontal, vertical, top, bottom, above or below, these terms or other location or directional specifications are to be understood in the position of use of the device.

According to an exemplary embodiment of the device, the radiation sensor may be connected to a control unit/processing unit which is configured. to process the radiation value captured by the radiation sensor.

The processing unit can comprise a microprocessor or a microcontroller for this purpose. In addition, the processing unit can be connected to a data memory which contains data and/or program commands for processing the radiation values captured using the radiation sensor. The processing unit can be connected to an input/output device, for example, a touchscreen, for the operation of the processing unit by an operator. Actions desired for post-exposure of the 3D body can be executed automatically by providing the processing unit. In contrast, these actions would be performed manually by an operator without the processing unit, for which purpose the radiation sensor may be connected to a display unit for displaying the captured measured values.

In order to be able to control the device appropriately, the radiation sensor may be connected via the processing unit to a control unit for a radiation source, which is provided for irradiating the body to be post-cured, and the processing unit may be configured to control the radiation source as a function of the value captured by the radiation sensor.

For example, the intensity values captured by the radiation sensor can thus be transmitted from the radiation sensor to the processing unit and processed therein. When the processing unit has corresponding information about the body to be cured and is designed to control the radiation source, the body can be irradiated by the processing unit as a function of the radiation intensity captured in the chamber.

A drive unit may enable the build platform and thus the body to be moved out of the receiving space in at least one direction. The drive unit may be designed to bring the build platform and/or the body into the chamber. The drive unit can comprise an electric motor, for example, a stepping motor, which is connected to the build platform. Particularly, the electric motor can be in engagement with a height-adjustable rod, the rod being connected to the build platform.

When the processing unit with the control unit for a radiation source may be additionally connected to a temperature sensor which is able to measure the temperature at at least one point in the receiving space or chamber, the body can be irradiated by the radiation source as a function of the temperature. An IR camera could also be used to monitor the temperature of the body during the final curing.

The control unit for the radiation source and thus also the processing unit is optionally designed to control the radiation intensity and/or the duration of the irradiation. The radiation source can be a light source, for example a source for visible light or UV light. The radiation intensity and/or the duration of irradiation generally have an influence on the final properties of the body to be cured.

It may be further foreseen that the chamber is connected to an adjustable heating device for setting a temperature in the chamber and/or an adjustable protective gas source for an adjustable supply of a suitable gas (for example, nitrogen) into the chamber.

In order to be able to control the device appropriately, the radiation sensor may be connected to the adjustable radiation source and/or an adjustable heating device and/or an adjustable protective gas source via the processing unit, and the processing unit may be configured to control the radiation source and/or the heating device and/or the protective gas source as a function of the intensity value captured by the radiation sensor. The radiation sensor may capture the current intensity values of at least one radiation source in the chamber.

When the radiation sensor is connected to the adjustable radiation source via the control unit/processing unit, the radiation source can be driven by the control unit/processing unit in order to change the current radiation intensity in the chamber.

When the radiation sensor is connected to the adjustable heating device via the control unit/processing unit, the heating device can be driven by the control unit/processing unit in order to control the radiation source and/or the heating device as a function of the current temperature in the chamber.

When the radiation sensor is connected to the adjustable protective gas source via the control unit/processing unit, the radiation source can be driven by the control unit/processing unit in order to control the light intensity as a function of the atmosphere in the chamber.

The at least one radiation source and the at least one radiation sensor may be protected by a receiving basin (protective function) in order to prevent direct contamination of the radiation source and/or the radiation sensor surface. The receiving basin may be open at the top to receive the build platform together with the body thereon. At least one radiation source and/or at least one radiation sensor can be located behind each surface of the receiving basin.

The receiving basin may be made of a material which has a particularly low absorption for the wavelength and/or spectrum used.

According to a further embodiment of the device, it can be provided that each radiation source has a radiation sensor thus resulting in an array of a plurality of radiation sources and radiation sensors, which can then be driven and read individually and/or sequentially.

Optionally, radiation sensors of the plurality of radiation sensors may be arranged in a row, for example in a single row (i.e. a one dimensional or 1-D arrangement of sensors). The radiation sensors of the plurality of radiation sensors may also be arranged in at least two rows. The at least two rows of radiation sensors may form a grid (or lattice) of radiation sensors, wherein the grid comprises at least three rows in each dimension of the grid (i.e. a two dimensional or 2-D arrangement of sensors).

The radiation sensor or the plurality of radiation sensors may be fixed relative to the receiving space and/or the radiation source. I.e. the radiation sensor may be arranged at a fixed or static position.

The radiation sensor or the plurality of radiation sensors or at least one radiation sensor of the plurality of radiation sensors may be moveable relative to the receiving space and/or the radiation source. For example, one or more radiation sensors may be moved around the receiving space to capture more in detail a spatial distribution of radiation, which may allow to monitor and optionally control the homogeneity more accurately.

Particularly, the radiation sources and radiation sensors can be combined on a circuit board and at least one circuit board can be installed per post-exposure unit.

With regard to the method, the disclosure also provides that the radiation sensor may be a light sensor, the intensity of a radiation source being captured using the light sensor, the intensity of the radiation source being changeable and the light sensor having to have a corresponding measuring range.

In order to avoid repetition of the part of the description relating to the device, reference is also made to the previous description of the device with regard to the description of the method, insofar as it is applicable to the method.

According to an optional embodiment of the invention, it can be provided that the intensity captured using the radiation sensor is compared in a processing unit connected to the radiation sensor with an expected value for the intensity of at least one radiation source and at least one method parameter is set as a function of the difference between the captured intensity and the expected value. The value of the method parameter can be captured by the radiation sensor. Particularly, by repeatedly comparing the intensity captured using the radiation sensor with an expected value of the intensity, the method parameters can be set or regulated to a target value. The method parameter can be set by the processing unit itself or controlled thereby.

According to the present disclosure, any light source that emits radiation that is able to cure the body can be used as a radiation source. Appropriately, these are mostly radiation sources that emit in the UV range in a wavelength range of approximately 350-420 nm, but this is not necessarily the case. For example, flash lamps or LEDs can be used as radiation sources. If LEDs are used as a radiation source, a plurality of LEDs having different central wavelengths can be combined in order to achieve a certain radiation spectrum.

For example, at least one circuit board and/or a plurality of individual circuit boards that are equipped with LEDs and radiation sensors may be placed in the equipment such that they illuminate the exposure space as homogeneously as possible.

Particularly, the radiation power can be approximately 10 mW/cm$^2$ to 100 mW/cm$^2$, preferably 40 mW/cm$^2$.

A radiation source which emits at 405 nm may be used.

Each radiation source can appropriately have a radiation sensor which is able to capture the optical radiation from an opposing radiation source and/or from a reflector and to transmit it to a control unit.

The receiving space or exposure chamber is preferably accessible at the top or at least at one point and can be closed by a build platform which may be the carrier of the body to be cured.

The receiving space may appropriately have a receiving basin that protects the radiation sources and the radiation sensors from direct contamination, while the receiving basin may be made of a material which is as transparent as possible or has as little absorption as possible for the radiation emitted by the radiation source.

Particularly, it can be provided that, on the basis of the intensity value of a radiation source captured using at least one radiation sensor, it is possible to draw conclusions about an impairment of the radiation power.

Furthermore, it can be provided that the radiation power of the radiation source can be increased as a function of the intensity captured using the sensor.

As an alternative to certain captured values of the intensity, a relative or absolute change in the intensity in the course of the operating time of at least one radiation source can also be used by the processing unit to control the at least one radiation source.

According to a further embodiment of the method, it can be provided that the radiation sensors are used in combination with the radiation sources to determine the location or the position of at least one body to be cured. The shadow cast by the at least one body may be used to detect its position. If the shadow cast changes during the post-exposure process, a fault condition, such as a detachment of the body from the build platform, can be inferred. The presence of a body in the receiving space can also be detected in this way.

It can preferably be provided that the post-exposure unit can be calibrated with the help of the control unit using the radiation captured by at least one radiation sensor and emitted by at least one radiation source.

Particularly, with the help of a plurality of radiation sensors, the homogeneity of the radiation in the chamber or the receiving space or basin can be captured locally and temporally by the control unit, as well as its temporal and spatial changes.

BRIEF DESCRIPTION OF THE DRAWINGS

The invention is explained in more detail in the following using preferred, non-limiting exemplary embodiments with reference to the drawings.

Shown are:

FIG. 11 schematically a device according to the invention in which the radiation source is regulated as a function of the temperature;

FIG. 12*a* schematically a diagram which shows the intensity of the radiation source as a function of the temperature;

FIG. 12*b* schematically a diagram with a temperature compensated radiation source behavior;

In the illustrated figures, parts of the device that do not serve to describe the respective figure have been omitted for the sake of clarity.

DETAILED DESCRIPTION

Figure 1:
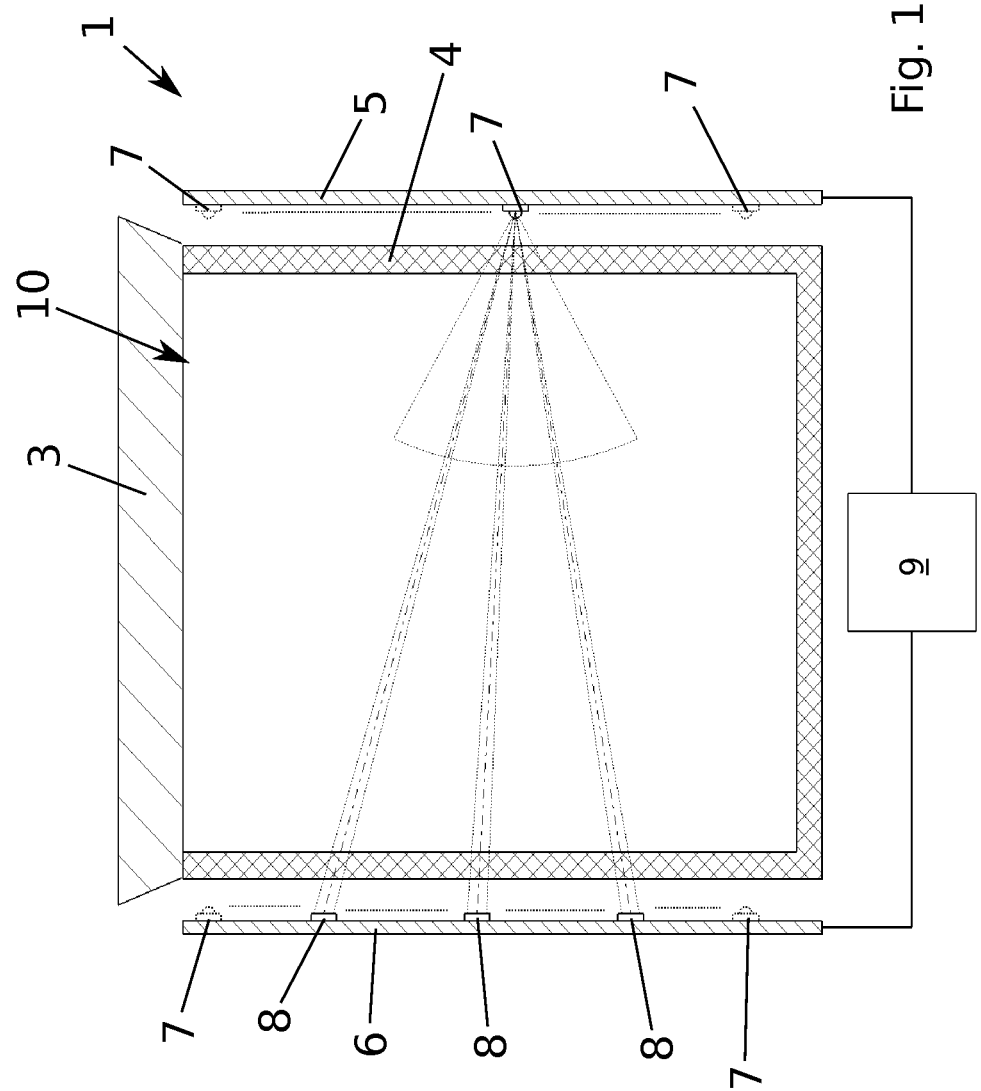
FIG. 1 schematically a post-exposure unit according to the invention for post-exposure of a 3D printed body.
Figure 7:
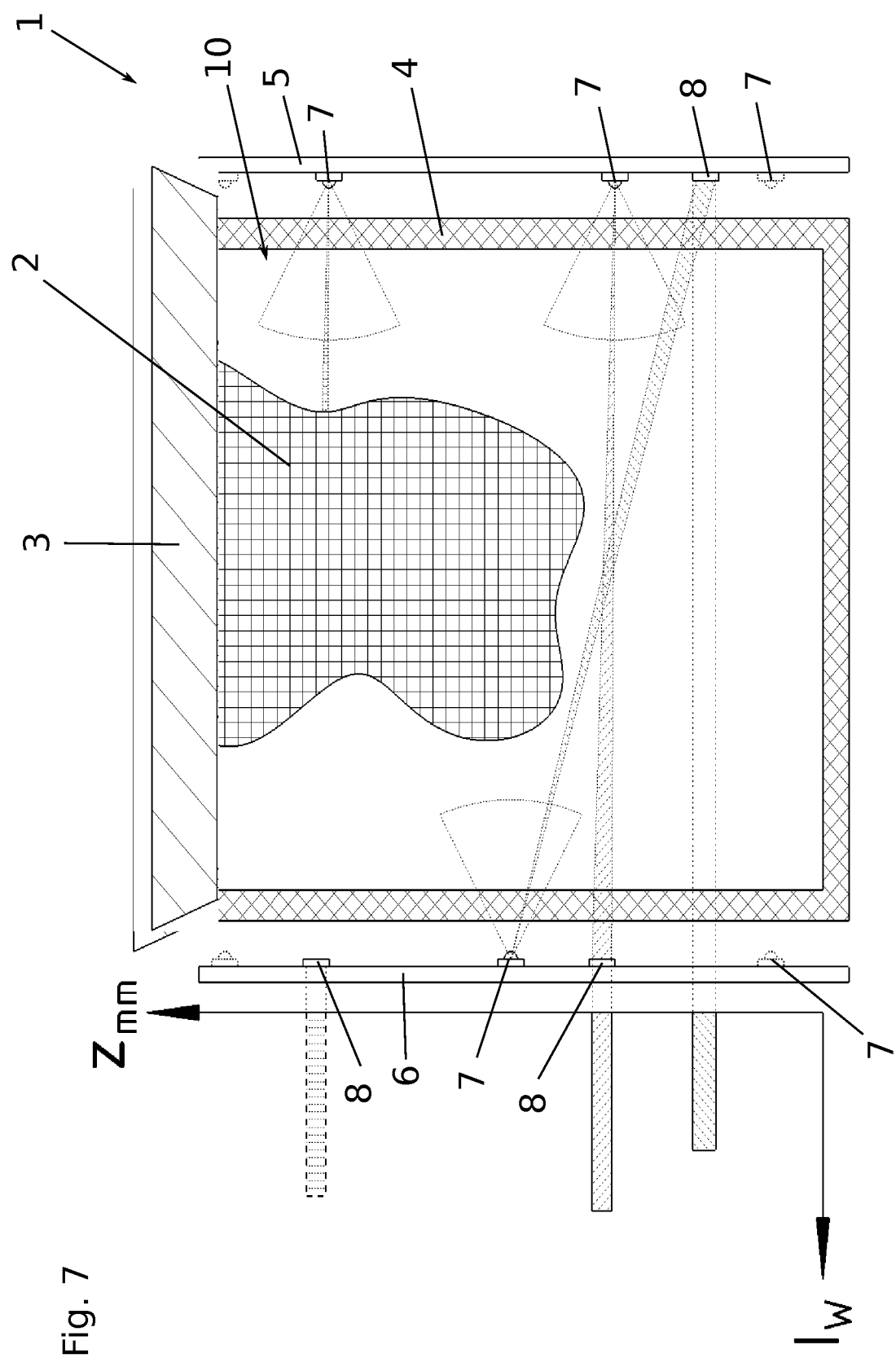
FIG. 7 schematically the device from FIG. 1 with a time-resolved and spatially resolved intensity measurement and a diagram with measured values of the intensity.
Figure 8:
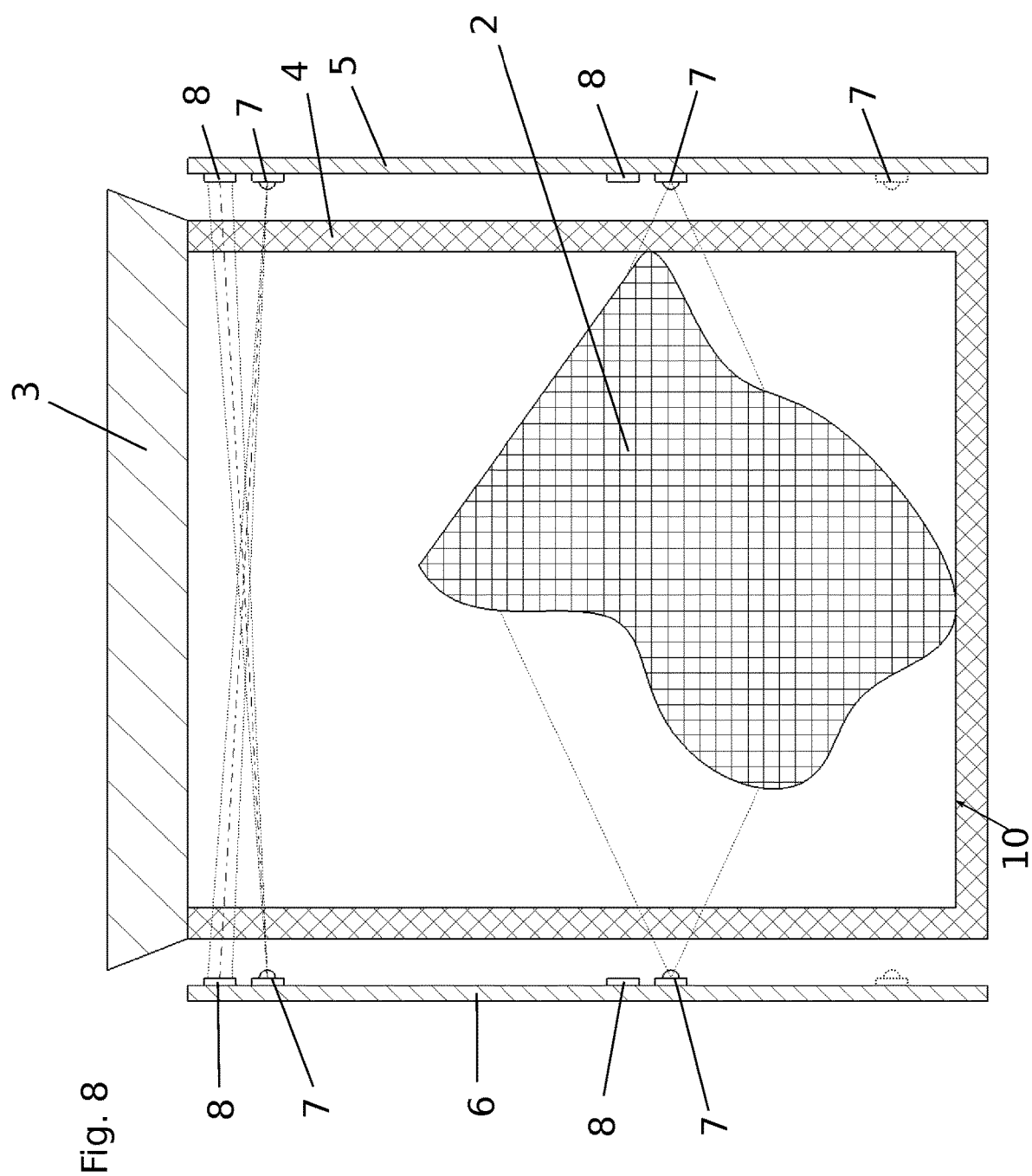
FIG. 8 schematically the device from FIG. 1 having a detached component in the receiving basin.

FIG. 1 shows a post-exposure unit 1 for post-exposure of a body 2 (see. FIG. 7) that hangs on a build platform 3, the post-exposure unit 1 comprising a receiving basin 4, a plurality of circuit boards 5, 6 and radiation sources 7 and radiation sensors, that are attached to the circuit boards 5, 6 and are connected via a control unit/processing unit 9. The intensity of at least one radiation source 7 is respectively captured on the opposite circuit board 5, 6 and by at least one radiation sensor 8 located thereon. As a result, the radiation intensity in the chamber 10 or at least one radiation source 7 can be captured, set or calibrated. This calibration can take place after a certain period of time and/or before each post-exposure process. The control unit/processing unit 9, for this purpose, is able to readjust the at least one radiation source 7 in accordance with the measured radiation intensity. When using LEDs as a radiation source, this can be done via the LED current. The intensity of the light sources 7 is measured here by respectively opposing radiation sensor 8.

Figure 2:
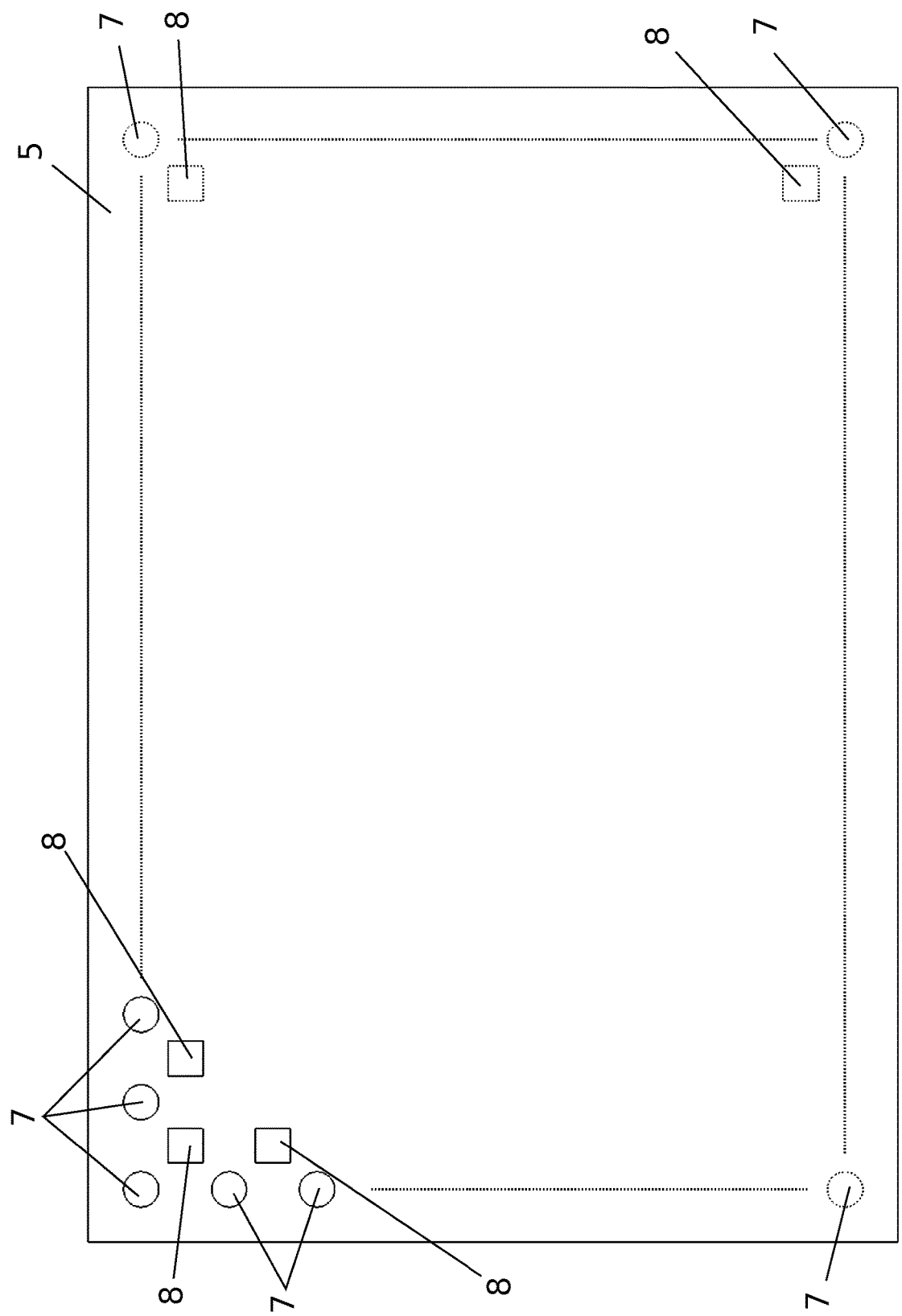
FIG. 2 schematically a detailed sketch of a circuit board which can be used in the device according to the invention.

FIG. 2 shows a circuit board 5 which can be used, for example, in the post-exposure unit 1 and which is equipped with a plurality of radiation sources 7 and radiation sensors 8. Each radiation source 7 has at least one radiation sensor 8 or, optionally, a plurality in order to increase the local measurement resolution.

Figure 3A:
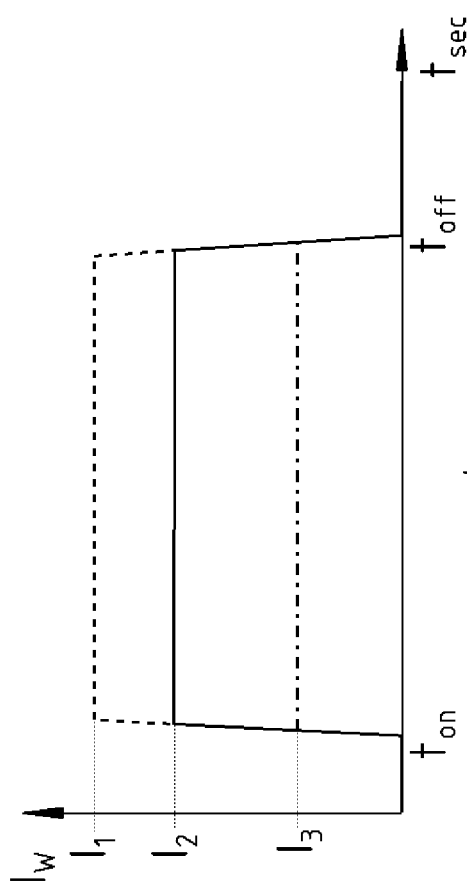
FIG. 3a schematically an exemplary intensity diagram for FIG. 1 and FIG. 3b an exemplary radiation angle of a possible radiation source.
Figure 3B:
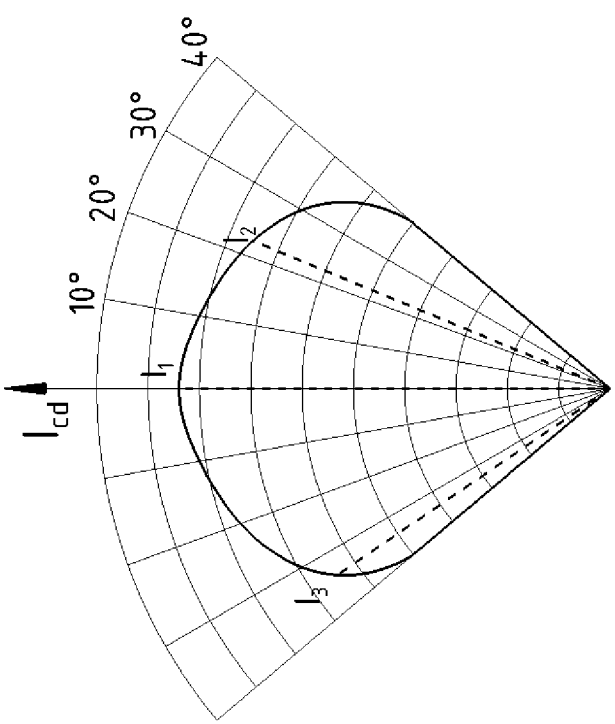

FIGS. 3*a* and 3*b* schematically show a calibration result matching the exemplary structure from FIG. 1. FIG. 3*a* shows the individual measured value curves captured at the radiation sensors 8 after a certain period of time. An expected radiation intensity can be inferred on the basis of the position of the radiation source from the angle-dependent radiation behavior of the radiation source depicted in FIG. 3*b*. A radiation behavior of an LED was assumed in FIG. 3*b*. The intensities measured at the sensors 8 allow conclusions to be drawn about the radiation angle, the status of the radiation source, etc.

Figure 4:
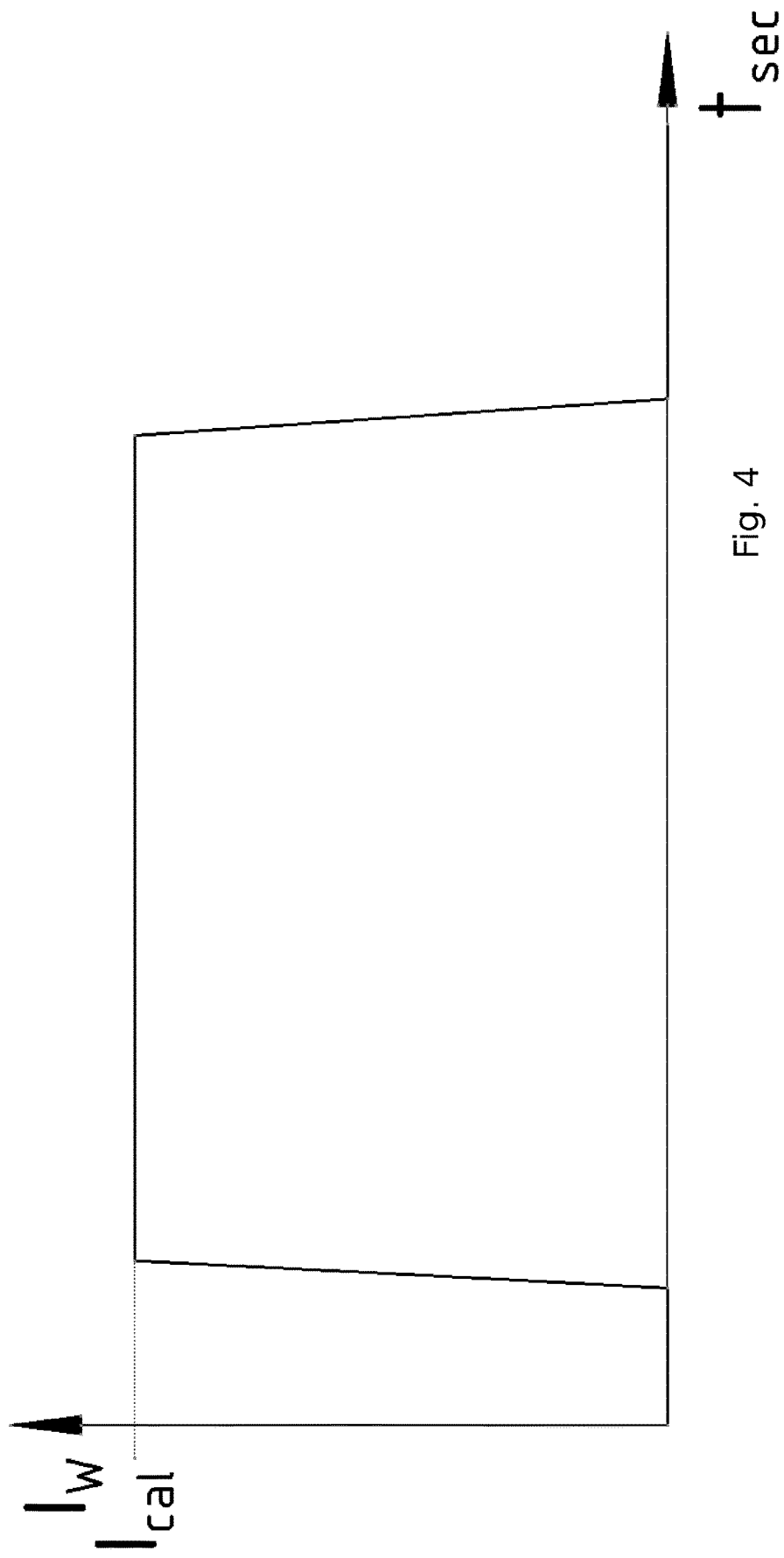
FIG. 4 schematically a calibrated intensity profile as an example for FIG. 1.

A calibration result based on the example shown in FIG. 1 is depicted schematically in FIG. 4.

Figure 5:
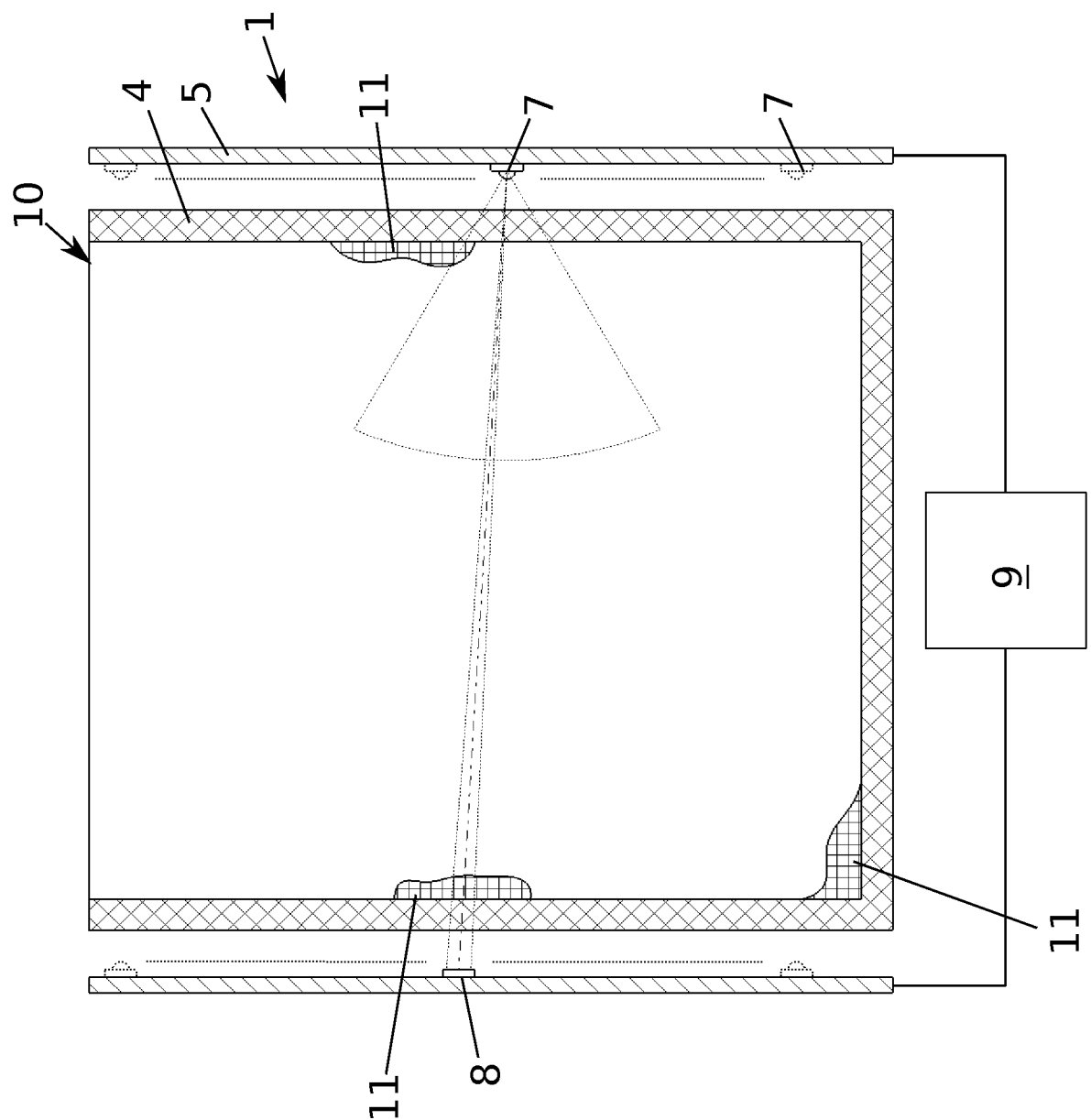
FIG. 5 schematically the device from FIG. 1 having different contaminations on the surface of the receiving basin.

FIG. 5 shows the post-exposure unit 1 according to FIG. 1 after at least one post-exposure process in which there has been contamination 11 of the receiving basin 4, wherein the contamination 11 prevents and/or hinders the homogeneous illumination of the chamber 10 and thus it can no longer be guaranteed that, in a renewed post-exposure process, the body to be exposed can be completely cured in the time period specified by the control unit/processing unit 9 according to the specifications for the corresponding material. As a result of the contamination 11 at least in parts of the receiving basin 4, as is depicted by way of example in FIG. 5, a lower value than a target value is measured on the opposite side of at least one radiation sensor B. The target value can correspond to the calibration value. If this is the case, an output can take place via the control unit/processing unit 9, the output informing the user of the unit 1 about the error that has occurred and optionally, requesting that the receiving basin 4 be cleaned. This allows additional process reliability and ensures that contamination of the post-exposure unit 4 for a given post-exposure duration and intensity cannot negatively influence the curing process or even prevent it completely in the case of severe contamination.

Figure 6:
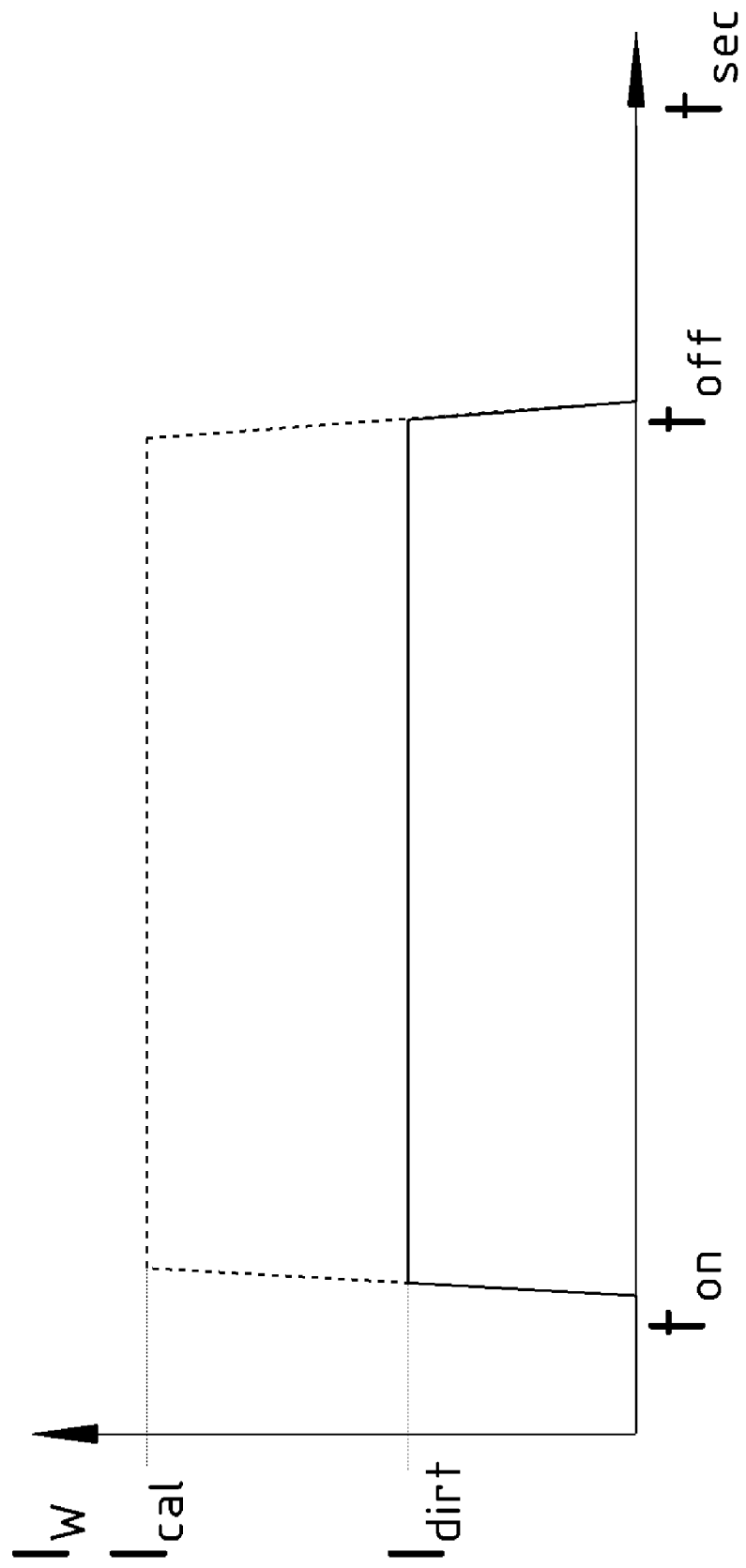
FIG. 6 schematically an exemplary measurement signal in the event of contamination and representation of the actual target value.

FIG. 6 shows a diagram in which the radiation intensity $I_{cal}$ to be achieved is plotted when there is no contamination. $I_{cal}$ represents the reference value that should be reached before each exposure process. The measured value represents a possible measured value in the event of a certain contamination of the receiving basin 4 (as shown, for example, in FIG. 5). If an $I_{cal}$ is not reached, an error message can be output via the control unit/processing unit 9 and/or an attempt can be made to increase the radiation intensity of the radiation sources 7 at least in certain regions so that $I_{cal}$ is reached.

FIG. 7 shows the post-exposure unit 1 according to FIG. 1 with a body 2 which is introduced into the post-exposure unit 1 and which hangs on a build platform 3. The radiation sources 7 here can be used in combination with the radiation sensors to detect the presence of a body 2 in the post-exposure unit 1, as shown. The shadowing at the radiation sensors 8 is captured differently here, depending on the geometric form of the body 2. In the example depicted in FIG. 7, a radiation sensor 8 is completely shaded and no measured value can be captured in order to be able to be compared with a previously captured target value. The target value here can come from the calibration of the chamber as was depicted in FIG. 1.

A print result can optionally also be checked based on the shadow cast, for example, whether the captured contour of the body corresponds to an expected contour. For this purpose, one or a plurality of movable radiation sources and/or movable radiation sensors can optionally be provided (for example, linearly movable or pivotable or rotatable about the receiving space).

The detachment of a body 2 from the build platform 3 is shown as an example in FIG. 4. A local change in the body 2 during and/or after the post-exposure process can thereby be detected through the difference in the shadow cast by the body 2, for example, in comparison to the case depicted in FIG. 7. An output can be made to the user in order to manually remove the body 2 from the receiving basin 4 based on detecting the detachment of the body 2 during the post-exposure process. This ensures additional process reliability and prevents a collision (crash) when a new body is introduced into the receiving basin 4.

Figure 9:
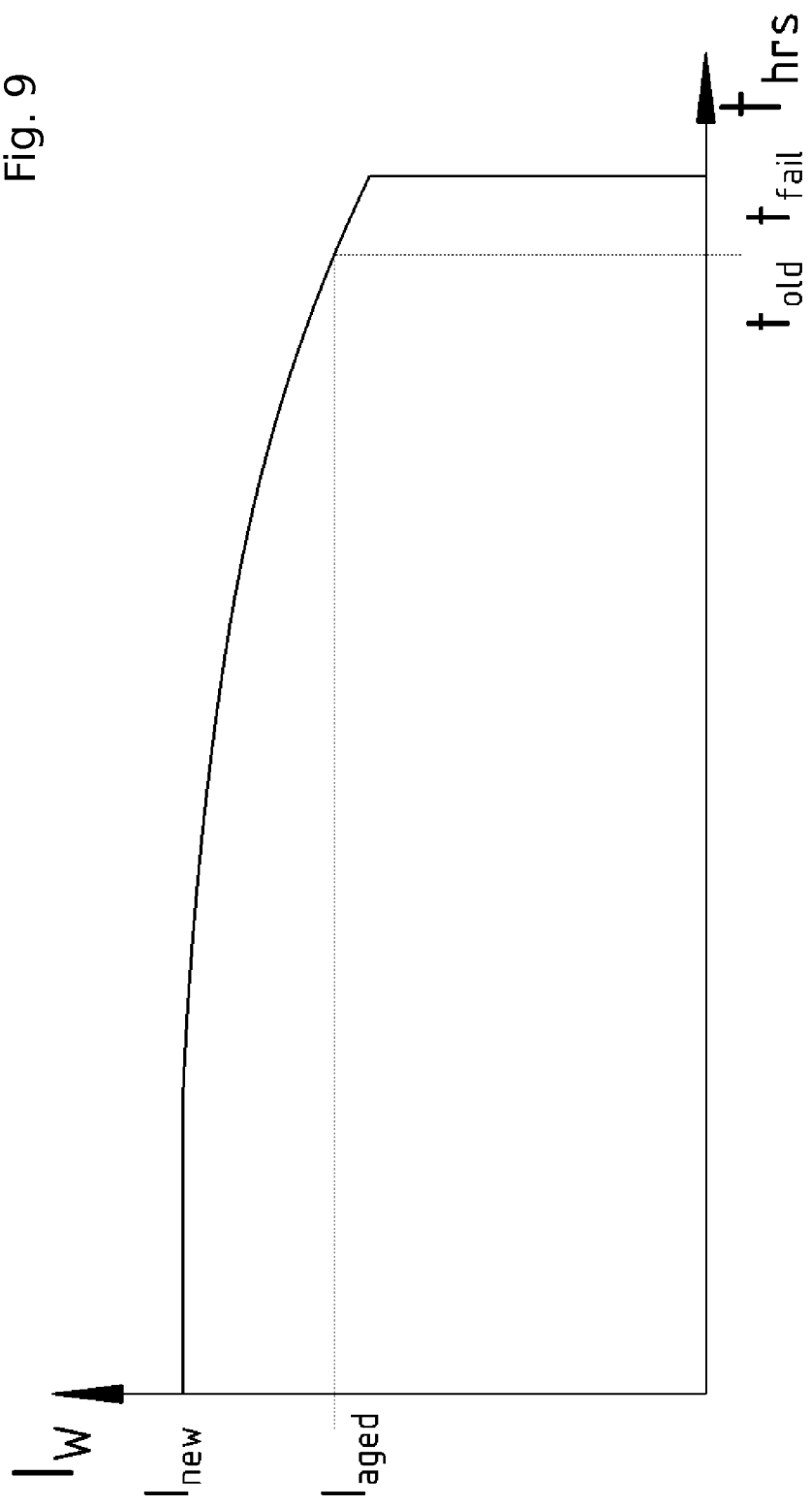
FIG. 9 schematically an exemplary aging curve of a radiation source as a function of the operating hours.

FIG. 9 shows an exemplary course of the decrease in intensity over the operating time of a radiation source 7. An LED is assumed here as the radiation source 7 as an example. At the beginning, the radiation source has an intensity $I_{new}$ which drops to the value $I_{aged}$ after a certain number of operating hours $t_{old}$. The current intensity value of the radiation source 7 can be captured together with the operating hours by using at least one radiation sensor 8. This allows conclusions to be drawn about the expected service life of the radiation source 7 and/or being able to detect a failure of a radiation source 7 and thus contributing to an increase in process reliability.

Figure 10:
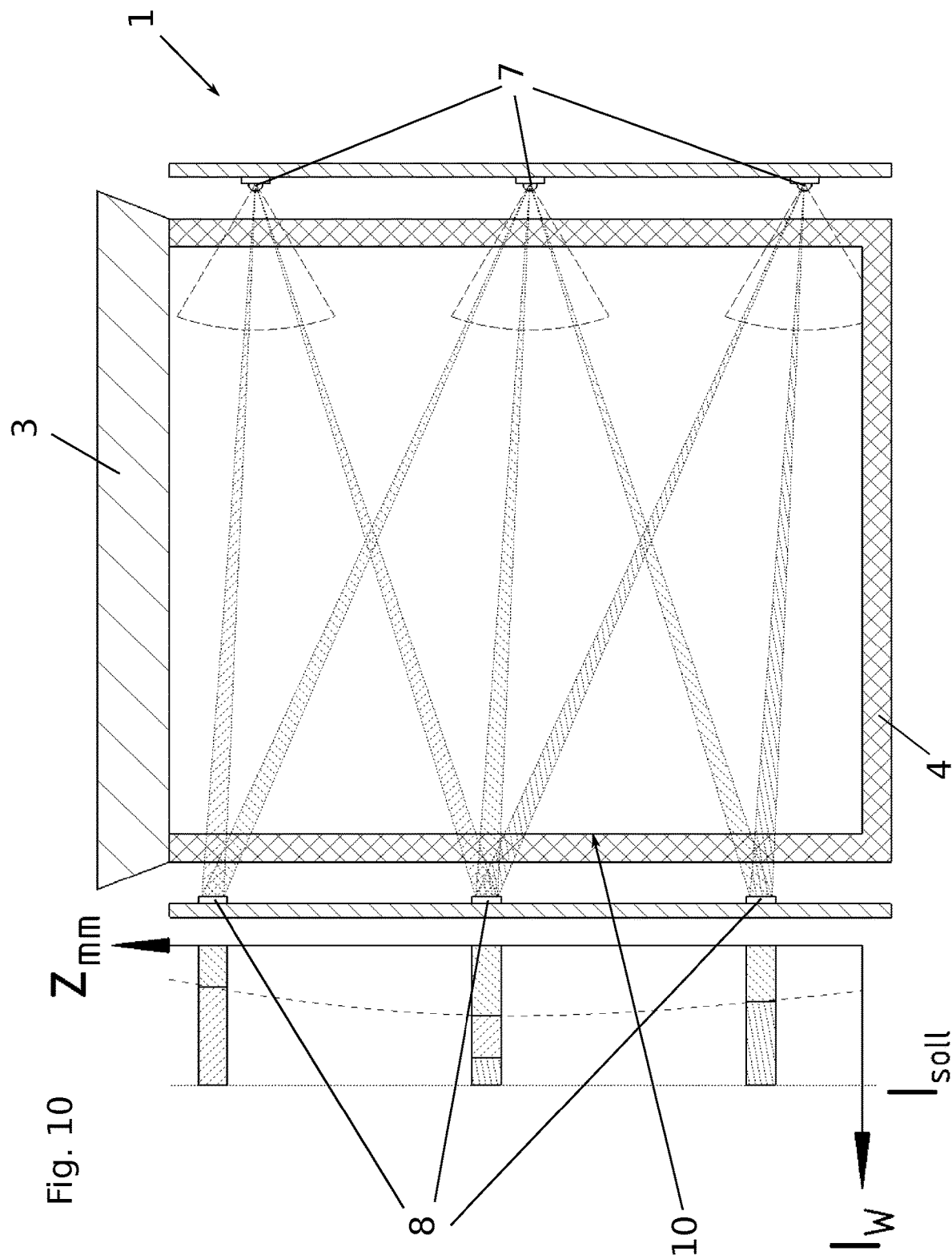
FIG. 10 schematically the device from FIG. 1, the spatially resolved intensity being set to a target value.

FIG. 10 shows the post-exposure unit 1 as before in a sectional illustration, the entire post-exposure unit 1 being calibrated when the build platform 3 is not equipped. In this case, all the radiation sources 7 that are present are switched on either simultaneously and/or individually and/or sequentially and while the measured values are captured by the opposite radiation sensors 8.

The post-exposure unit 1 can also be heated in the example depicted in FIG. 11. The increase in the temperature in the receiving basin 4 serves, for example, to accelerate the curing process or to provide support by activating additional, unused initiators in the body 2. An increase in the temperature in the post-exposure unit 1 leads to a change in the operating point of the radiation source 7 and thus to a radiation behavior of the at least one radiation source 7 that is a function of the temperature. To compensate for this, the intensity value can be captured on at least one radiation sensor 8 and this can be kept constant when the temperature increases by regulating the intensity of the radiation source 7. This can be done by tracking the LED current when using a LED as the radiation source 7.

This is also advantageous since the radiation source 7 itself can lead to an increase in the temperature in the post-exposure unit 1, that is, even without the presence of a heater. A decrease in intensity of the radiation source 7 ever the exposure period can thus be compensated for in this case too.

FIG. 12*a* shows the course of the temperature in the post-exposure unit 1, the light intensity emitted by the radiation source 7 falling as the temperature rises. This therefore leads to the fact that less radiation intensity than specified can arrive at the body 2 and the post-exposure time is therefore not sufficient to cure the body 2 to the end. This can distort the component properties and lead to production errors. In order to prevent this, the radiation values captured by the radiation sensor 8 can be used to readjust the radiation sources 7 that were built into the post-exposure unit 1. The readjustment here is carried out so that the light intensity is kept constant as the temperature rises. This can be achieved, for example, in LEDs that can be used as radiation source 7, by regulating the LED current.

The following variants and advantages can optionally be achieved with the present disclosure:
LED sensor controlled post-exposure unit
At least one sensor per panel (measurement of light intensity, LED aging/contamination)
Measurement of the irradiation power of each panel by the opposite panel
Measurement of the homogeneity of each panel and readjustment
Combination of a plurality of wavelengths to achieve a broader wavelength range
Calibration of the light output power
Compensation for LED degeneration
Efficient cooling/temperature control to improve the performance stability of the LEDs
Calibration at every power-on
Measurement of the shadows cast by generated bodies
Measurement of whether the generated body is present in the box (shadow)
Clustering of the LEDs
Measurement of the contamination of the glass during calibration
Measurement of contamination that has just occurred during the exposure
Individual irradiation as a function of occupancy of the build platform Further General Embodiments 1. A device for post-exposure of a body 2 manufactured by means of an additive manufacturing method from a substance curable by radiation, the device comprising a receiving basin 4 for protecting the at least one radiation source and the at least one radiation sensor 8, the device further comprising a build platform 3 which is carrier of the body 2, characterized in that an at least partially closed chamber 10 is formed, the chamber 10 comprising a receiving basin 4 which can be irradiated by at least one radiation source 7 and further comprising at least one radiation sensor 8 which is placed in such a way that it is able to capture the radiation emitted by the radiation source 7 and to transfer it to a control unit/processing unit 9.

2. The device according to embodiment 1, characterized in that the radiation sensor 8 is connected to a control unit/processing unit 9 which is configured to process the measured value captured by the radiation sensor 8.

3. The device according to embodiment 2, characterized in that at least one radiation sensor 8 is connected to at least one radiation source 7 via the control unit/processing unit 9 and the intensity of at least one radiation source 7 can be controlled.

4. The device according to any one of the embodiments 1 to 3, characterized in that a change in the state of the chamber 10, for example, from a defined calibration value, can be captured with the help of at least one radiation sensor 8, and appropriate measures can be taken via the control unit/processing unit 9.

5. The device according to embodiment 2 and embodiment 4, characterized in that at least one radiation sensor 8 for capturing the radiation from at least one radiation source 7 is arranged opposite thereof.

6. The device according to any one of the embodiments 1 to 5, characterized in that the chamber 10 can be closed by a build platform 3 which carries at least one body 2.

The invention claimed is:

1. A post-exposure unit for post-exposure of a body manufactured using an additive manufacturing method from a substance curable by radiation, the post-exposure unit comprising:
at least one radiation source configured for post-exposure;
wherein the post-exposure unit has at least one radiation sensor;
wherein the at least one radiation sensor is configured for capturing radiation emitted by the at least one radiation source;
a processing unit connected to the at least one radiation sensor and configured to monitor a radiation signal captured by the at least one radiation sensor; and
a receiving space formed in a receiving basin for receiving a body to be post-exposed;
wherein the at least one radiation sensor is configured to capture the radiation emitted by the at least one radiation source and the radiation emitted traverses at least a part of the receiving space at least once;

wherein the at least one radiation source and the at least one radiation sensor are arranged outside the receiving basin;

wherein the receiving basin is made of a material which is transparent for the radiation emitted by the at least one radiation source;

and wherein the at least one radiation sensor and the at least radiation source are arranged on opposite sides of the receiving space.

2. The post-exposure unit according to claim 1, wherein the at least one radiation sensor is configured to capture a radiation intensity and/or a radiation wavelength of the radiation emitted by the at least one radiation source.

3. The post-exposure unit according to claim 1, wherein the at least one radiation sensor includes at least two radiation sensors and the at least one radiation source includes at least two radiation sources, wherein both one of the at least two radiation sources and one of the at least two radiation sensors are arranged on at least one side of the receiving space.

4. The post-exposure unit according to claim 1, wherein the processing unit is configured to signal deviations of a radiation signal from a predefined expected value.

5. The post-exposure unit according to claim 1, wherein the at least one radiation sensor and the at least one radiation source are connected to a processing unit, wherein the processing unit is configured to control the at least one radiation source on a basis of a radiation signal captured by the at least one radiation sensor.

6. The post-exposure unit according to claim 5, wherein the processing unit is configured to control the at least one radiation source on the basis of a radiation intensity and/or radiation wavelength captured by the at least one radiation sensor.

7. The post-exposure unit according to claim 5, wherein the processing unit is configured for regulating a radiation intensity and/or radiation wavelength respectively to a target value.

8. The post-exposure unit according to claim 1, wherein a plurality of radiation sensors including the at least one radiation sensor are configured to capture the radiation emitted by the at least one radiation source in different directions.

9. The post-exposure unit according to claim 8, wherein the plurality of radiation sensors are arranged in a row.

10. The post-exposure unit according to claim 9, wherein the plurality of radiation sensors are arranged in at least two rows.

11. The post-exposure unit according to claim 10, wherein the at least two rows of the plurality of radiation sensors form a grid of the plurality of radiation sensors, wherein the grid comprises at least three rows in each dimension of the grid.

12. The post-exposure unit according claim 1, wherein the at least one radiation sensor is fixed relative to the receiving space and/or the at least one radiation source.

13. The post-exposure unit according to claim 1, wherein the at least one radiation sensor is moveable relative to the receiving space and/or the at least one radiation source.

14. Equipment for post-processing a body manufactured using an additive manufacturing method from a substance curable by radiation using a post-exposure unit according to claim 1, comprising:

a transport device comprising a drive for moving a build platform relative to the post- exposure unit.

15. A method for post-exposure of a body manufactured using an additive manufacturing method from a substance curable by radiation utilizing a post-exposure unit according to claim 1.

* * * * *